March 9, 1948.    C. M. TUTTLE    2,437,411
DENSITOMETER
Filed Nov. 8, 1945    2 Sheets-Sheet 1
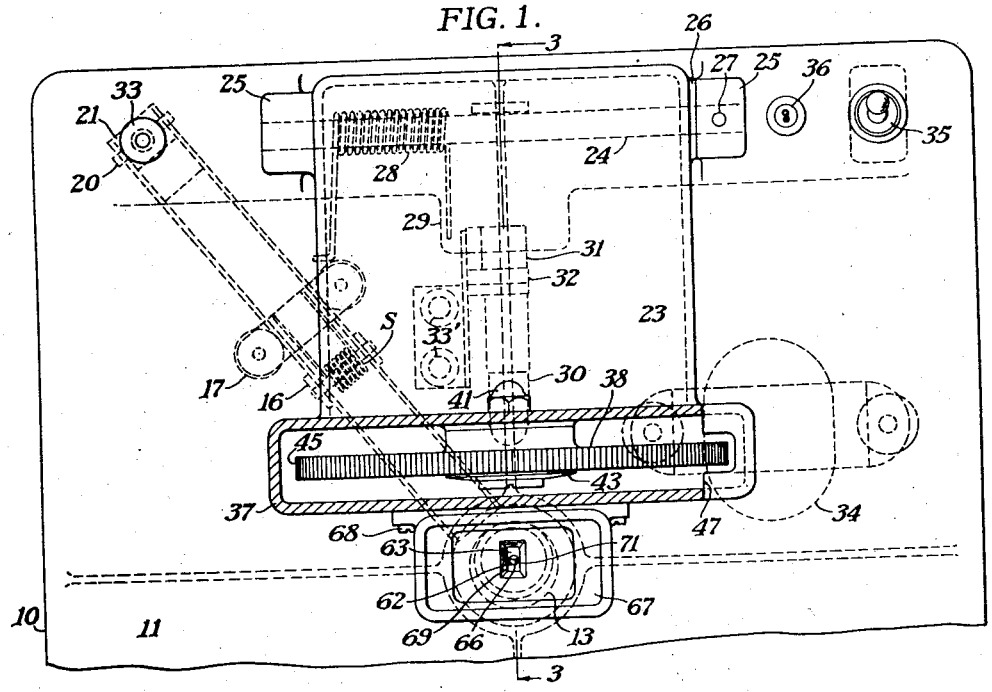
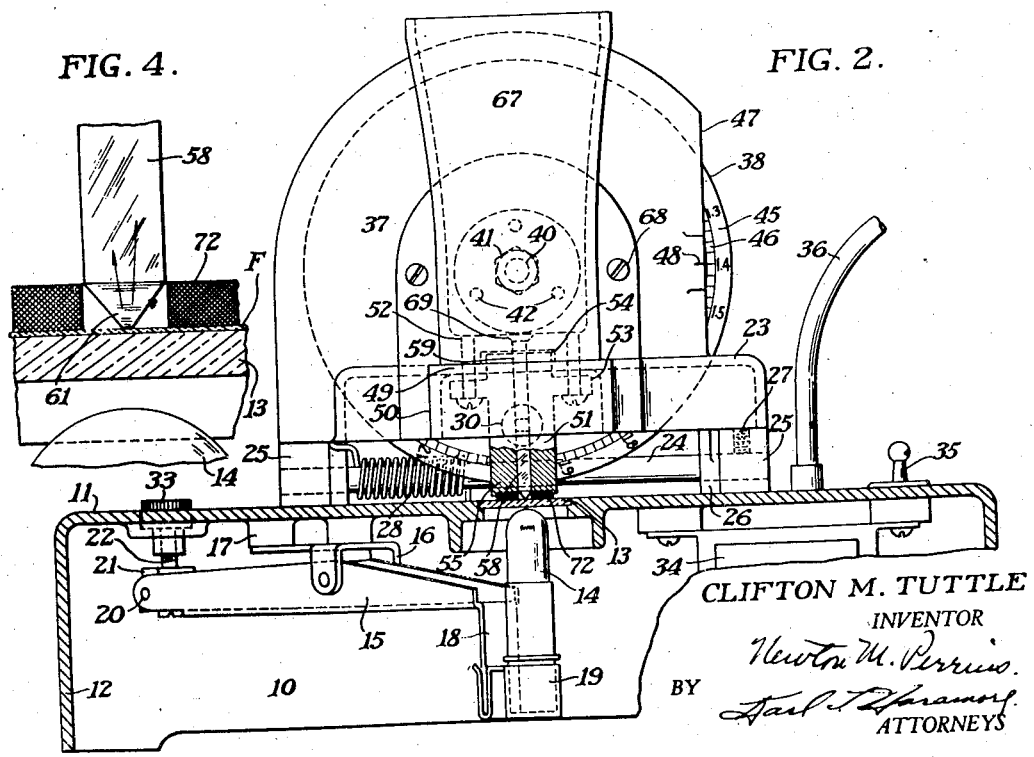
CLIFTON M. TUTTLE
INVENTOR March 9, 1948.  C. M. TUTTLE  2,437,411
DENSITOMETER
Filed Nov. 8, 1945   2 Sheets-Sheet 2

CLIFTON M. TUTTLE
INVENTOR
BY
ATTORNEYS

Patented Mar. 9, 1948

2,437,411

UNITED STATES PATENT OFFICE 2,437,411

DENSITOMETER

Clifton M. Tuttle, Rochester, N. Y., assignor to Eastman Kodak Company, Rochester, N. Y., a corporation of New Jersey Application November 8, 1945, Serial No. 627,373

13 Claims. (Cl. 88—14)

The present invention relates to a densitometer, and particularly to a densitometer of the transmission type to be used for measuring the density of photographic film.

The primary object of the present invention is to provide a low priced densitometer which is not only pleasing in appearance and easy to operate, but which is very efficient in operation.

Another object is to provide a densitometer which eliminates the use of all expensive optical elements and which can be fabricated, for the most part, from plastics by molding.

And another object is to provide a densitometer in which two light transmitting and integrating rods of light transparent material (plastic) transmit the light passing through the film and that passing through the density wedge to a point for comparison, the exit ends of the two rods constituting, in themselves, the comparison or matching fields.

And a further object is to arrange the two rods so that flat sides on the exit ends thereof are in abutting relation so that the joint between the two forms a line of demarcation separating the two matching fields which will substantially disappear when the two fields are properly matched in light intensity.

Another object is to provide a densitometer which includes a pivoted head which may be moved away from the base to place a film negative in measuring position and which may then be dropped down on the film for measuring purposes; and in which all of the parts necessary to form the two comparison fields, with the exception of one light source, are compactly arranged in said head.

Another object is to provide a densitometer of the type set forth having means for readily adjusting the distance between one light source and the window over which the film is positioned to vary the intensity of illumination of said window for initially adjusting and/or balancing the instrument for use.

And a further object is to provide means on the lower end of the head of the instrument which serves to both protect the film and the end of one of the light-transmitting rods from injury and to properly position said end of the rod a proper distance from the film surface for measurement.

And another object is to provide a light transmitting and integrating rod which permits the entrance end of the rod to be reduced to a minimum cross-sectional area so that small areas of the film may be measured.

Figure 3:
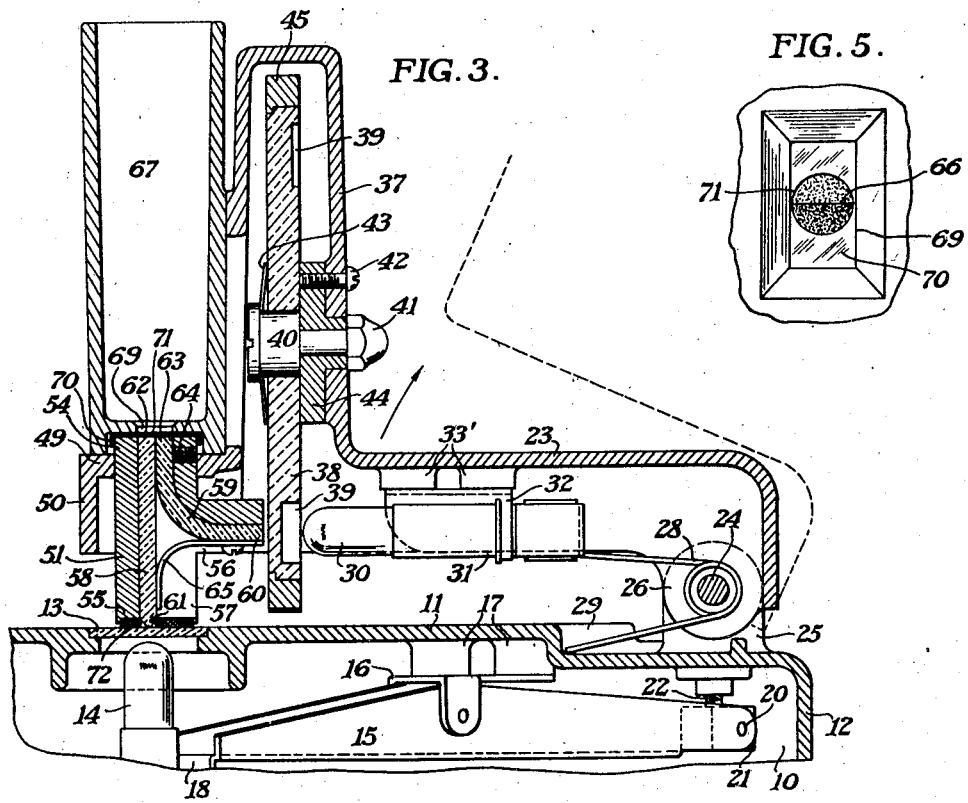
Figure 5:
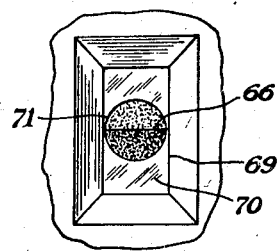
Figure 6:
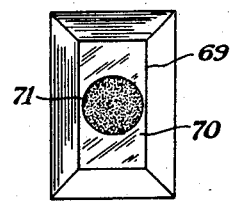
Figure 7:
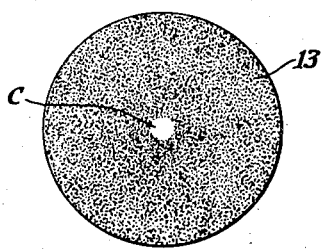

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings in which, Fig. 1 is a top plan view, partly in section, of a densitometer constructed in accordance with a preferred embodiment of the present invention, Fig. 2 is a front view, partly in section, of the densitometer, Fig. 3 is a vertical section taken substantially on line 3—3 of Fig. 1, Fig. 4 is an enlarged sectional detail showing the form of the entrance end of the light transmitting rod for measuring the light passing through the negative, and showing the means for protecting the end of said rod and the film and for positioning the end of the rod relative to the film surface, Fig. 5 is an enlarged plan view of the comparison field of the instrument showing how it appears when the two fields are not matched, Fig. 6 is a view similar to Fig. 5 and showing how the comparison field appears when the two fields are matched in intensity, and Fig. 7 is an enlarged top view of the window in the base over which the negative to be measured is positioned.

Like reference characters refer to corresponding parts throughout the drawings.

Referring now to the drawings, the present densitometer comprises a hollow base 10 which may be molded of a suitable plastic material. This base includes a flat top 11 which terminates in a vertical apron 12 the bottom edge of which serves to support the instrument on a table for use. Located substantially in the center of the top 11 is a window 13 over which a film negative F, the density of which is to be measured, is laid in a flat condition, as is well known and as indicated in Fig. 4. This window 13 preferably consists of a glass disk which is situated in a recess molded into the top of the base so that the top of the disk is flush with the top of the base. As shown in Fig. 7, the entire window, with the exception of a small circle C in the center, is rendered light diffusing while the circle in the center is left clear. This clear circle is approximately the size of the area of the point in the film to be measured, or approximately the size of the tapered end on the light-transmitting rod, to be described, so that it aids the operator in positioning the negative with the area he desires to measure in a proper location for measurement. Furthermore, the major portion of the window which is not used during the density measurement, but is necessary to aid in selecting the desired area, would blind the operator if it were clear and not light diffusing.

This window is adapted to be illuminated by a light source in the form of a small low voltage lamp 14 which is adjustably mounted within the base so that the distance between the lamp and the window may be altered to vary the intensity of illumination of the window for the purpose of initially balancing the instrument, as is well known, and as will be pointed out below. The mounting means for the lamp consists of a pivoted lever or walking beam 15 pivoted intermediate its ends in a yoke 16 fixed to bosses 17 formed on the under side of the top of the base. One end of the lever has a turned-down end 18 onto which is slipped a socket or clip 19 in which the lamp 14 is positioned. The other end of the lever is pivoted at 20 to a block 21 which is in threaded engagement with an adjusting screw 22 which extends through and is rotatably mounted in the top of the base. The top of this screw may be flush with the top of the base and be provided with a slot for the reception of a screw-driver, etc., for adjustment, or as shown it may extend above the top of the base and be provided with a knurled hand knob 33. A double-ended coil spring S is mounted on the hinge pintle of the lever between the arms of yoke 16 and serves to normally force the lever to pivot in one direction to eliminate any back lash in the adjusting screw 22. By turning the adjusting screw, the lamp 14 is moved toward or away from the window 13 to vary the intensity of illumination of the same, and the lamp mounting means is such that an interchange of lamps, in case of failure, etc., may be readily effected.

Located on the top of the base is a hollow head 23 which may be readily molded from a plastic material, and which houses the majority of the optical means for forming the two matching fields and the complete comparison field and getting the light beams thereto. At its rear end this head is hinged to the rear edge of the top of the base so that it can be lowered to an operative position, in which it is shown, or it can be raised to a film loading, or inoperative, position indicated by the dotted line position shown in Fig. 3. This hinge connection comprises a pintle 24 passing through apertured bosses 25 and 26 formed on the base and head, respectively, said pintle being held in position by a set screw 27 threaded into one of the bosses 25 on the base. A coiled spring 28 surrounding the pintle, and having one end engaging the lower side of the head and the other end lying in a recess 29 on the top of the base, serves to counter-balance the weight of the head so that it will not drop freely onto the top of the base when released.

In the rear horizontal portion of the head there is mounted a light source in the form of a lamp 30 which is preferably of the same type as, and matched with, the lamp 14 in the base. This lamp is held in position by slipping a socket clip 31 thereon onto a bracket 32 fixed to a pair of bosses 33' formed on the head. The two lamps 14 and 30 are connected in a circuit which includes a transformer and a switch so that the device may be plugged into a standard source of power, e. g. 110 v. The complete circuit is not shown, since it constitutes no part of the present invention, but the transformer 34 and the switch 35 are shown in the positions they assume in or on the base. The cord 36 for plugging the device into a wall socket is shown coming out of the top of the base at the rear thereof. If desired, an adjustable two-position rheostat, not shown, might be included in the circuit of one or both lamps to permit the lamps to be dimmed for selection of the area of the negative to be measured and then be turned on bright for the actual density measurement of the selected area.

Rotatably mounted in a vertically disposed semi-circular portion 37 of the head is a neutral density wedge 38, the variable density portion of which passes in front of the lamp 30. While this wedge may be constructed in any well-known manner, I have found that it can be cheaply made by molding from a transparent plastic impregnated with a suitable pigment, such as carbon black. The wedge portion of the disk comprises a circular channel 39, varying regularly and continuously in depth throughout its length, formed in one face of the disk. The varying thickness left by this channel forms a very satisfactory density wedge, and the channel may be machined out or it may be molded into the disk if desired.

This density wedge is rotatably mounted in the head on a stub shaft 40 fixed to the rear wall of the semi-circular portion 37 by means of a cap nut 41, and screws 42 to keep it from rotating. The wedge is held against free rotation by a spring washer 43 which frictionally engages one face thereof and forces the other face of the wedge against the flange 44 associated with the stub shaft 40. Fixed to the periphery of the density wedge in any suitable manner, as by a setscrew, not shown, is a knurled rim 45 the face of which includes a scale 46 reading in density values. As shown in Fig. 2, the rim of the disk extends through a cutaway part 47 of the semi-circular portion 37 of the head so that the wedge can be rotated by a person engaging the knurled rim with his finger, and so that the scale 46 co-operates with an index mark 48 on the face of the semi-circular portion 37 of the head to facilitate reading the scale.

The bottom of the forward wall of the semi-circular portion 37 of the head terminates in a horizontal wall 49 and a vertical apron 50. A metal tube 51 of the form best shown in Fig. 2 is fastened to the lower side of this horizontal wall by screws 52 passing through wings 53 on the tube and into tapped holes in said wall. As clearly shown in Fig. 3, the upper end 54 of this tube extends upwardly through said horizontal wall, while the lower end 55 thereof extends downwardly just short of the top of the base when the head is in its operative position. As shown in Fig. 3, the tube includes a branch 56 which extends toward, and terminates just short of, the density wedge.

Within a recess 57 formed in said tube 51 there are mounted a pair of light transmitting and integrating rods 58 and 59 which are adapted to direct the light passing through the negative and the light passing through the wedge to two matching fields which in combination form a comparison field for matching purposes. The rod 58 is straight while the rod 59 is curved, and they are mounted in the recess 57 of the tube so that the light entrance end 60 of the curved rod 59 is adjacent the density wedge and in alignment with the light rays passing through said wedge, while the light entrance end 61 of the rod 58 is adjacent the window and in alignment with the clear circle C therein, or in a position to receive the light rays passing through that portion of the negative located over the clear circle in the center of the window. The entire rods 58 and 59 are rectangular in cross section, or at least the light exit ends 62 and 63 of the rods 58 and 59, respectively, have a flat side, if they are circular in cross section, extending longitudinally of the rod so that they can be brought into side-by-side relation and be firmly held in such a position by a setscrew 64. The other ends of the rods are firmly held in the tube by a curved metal strap 65 which is fastened to the branch 56 of the tube by screws. This strap not only serves to hold the rods 58 and 59 in position but also acts as a light trap to prevent the light in the lamp 30 from striking the walls of the rods and affecting the accuracy of the instrument.

The rods 58 and 59 may be made of any transparent material and I have found that a transparent synthetic plastic material, e. g. methyl methacrylate sold under the trade name, Lucite, is particularly suitable because it not only possesses the desirable light transmitting characteristics, but it is cheap, easy to fabricate, and is unbreakable. Rays of light entering one end of these rods are multiply reflected from the walls thereof, because of the well-known principle of total internal reflection due to the difference in the refractive index between the transparent material and air, and subsequently pass from and illuminate the other end of the rods. Because of the fact that practically all of the light rays passing through the rods are totally reflected when they strike the walls thereof, there is very little loss of light upon passing therethrough and practically all of the light entering one of the rods passes to the other end thereof. Any loss of light which might be encountered will be found in the curved rod only and then at the bend thereof when the angle of incidence of certain rays of the light might drop below that necessary for total reflection. If this difficulty is encountered because of the radius of the bend found necessary in the curved rod, the walls of the curved portion of this rod may be coated with an opaque reflecting material to overcome all loss of light, but I have found that if the curved rod has a curvature of the order of that shown in the drawings that satisfactory results are obtained if the walls are left untreated.

By virtue of the fact that light rays entering one end of the rod are multiply reflected by the walls of the rod during its passage therethrough to the other end, the light entering the rod is integrated while passing through the rod and is uniformly spread over the area of the exit end thereof. This fact makes it possible to use the exit end of these rods as the matching fields of the densitometer and does away with the need for elaborate optical systems including light diffusing means for the matching fields as in conventional instruments of this type. Consequently, the exit ends of the two rods 58 and 59 are polished and are used as the matching fields of the instrument. Inasmuch as the two exit ends 62 and 63 of the rods are in abutting relation, the two matching fields will be in side-by-side relation for ready and easy comparison. As will undoubtedly be obvious to those skilled in the art, when I refer to the flat sides of the ends 62 and 63 of the rods being in abutting relation, I mean mechanical abutment to provide the line of separation between the matching fields but not optical contact, of course, because of the air layer required adjacent all walls of the rods for total internal reflection of the light rays. If the ends of the rods were in optical contact, then light would pass from one to the other, rather than being totally reflected, and the apparatus would be inoperative or at least inaccurate.

The accurate matching of the two light fields in a densitometer is more or less difficult for persons having normal eyesight, but is particularly difficult for a person suffering a deficiency in color sense. With the present arrangement of parts, the difficulty of correctly matching the two fields is greatly eliminated because the absolute reliance on the color sense of the operator is eliminated. In the present instrument, the line of separation between the two exit ends of the rods appears as a decidedly dark line in the comparison field when the intensities of illumination of the two ends of the rods are not matched, and this line of division gradually reduces in density as the fields approach a match, until when the fields are perfectly matched this line is practically invisible and the two matching fields appear as one. In Fig. 5 the complete comparison field of the instrument is shown as it would appear when the two matching fields are far from matched. It will be noticed that the two fields are separated by a dark line 66 which is the line of separation between the ends of the rods 58 and 59. In Fig. 6, the comparison field is shown as it would appear when the two fields are perfectly matched, and it will be noticed that the dividing line 66 has disappeared and the matching fields appear as one. While a thin layer of air between the abutting ends of the rods is preferred to obtain the necessary total internal reflection at these portions of the rods in order to obtain the separation line 66 which substantially disappears when the fields are matched, a thin layer of any suitable reflecting material could be applied to one or both of the abutting faces of the rods to obtain the necessary total internal reflection. This procedure is not as satisfactory as the layer of air, however, since it would produce a line of separation between the matching fields which would not disappear when the fields were matched in intensity.

To facilitate viewing the comparison field of the instrument, a light excluding tunnel 67 is fastened on the front wall of the semi-circular portion 37 of the head by screws 68. The lower end of this tunnel rests upon the top of the horizontal wall 49 in overhanging relation with the upper end 54 of tube 51, and includes a rectangular aperture 69 framing the exit ends of the rods 58 and 59. The upper end of this tunnel is completely open, as shown, or may be provided with a small eye-piece to permit one to view the comparison field. While the entire area of the two exit ends of the rods 58 and 59 framed by the aperture 69 in the tunnel 67 could be used as the comparison field, I have found that matching of the fields is made easier if their areas are reduced. Accordingly, I slip a mask 70 onto the top end 54 of the tube 51 which includes a circular opening 71 and which defines a reduced circular comparison field made up of two adjacent semi-circular matching fields, as shown in Fig. 5.

In order to facilitate the density measurement of a small selected area of a film negative, the entrance end of the rod 58 is tapered down to a point, as shown in Fig. 4, having a cross-sectional area comparable to that area on a film which it is desired to measure and which is many times reduced with respect to the cross-sectional area of the exit end of the rod. I have found that reducing the entrance end of this rod to a cross-sectional area of a few square millimeters provides a very selective instrument. As shown in Fig. 4, the tapered end of rod 58 extends below the lower end 55 of tube 51. Fixed to the lower end 55 of the tube 51 in encricling relation with the tapered end of rod 58 is a washer 72 of resilient material, e. g. rubber or the like. This washer is of such thickness that its lower surface extends slightly beyond the end of the tapered point of rod 58 and serves several purposes. First, it protects the window 13 from being broken if the head is dropped down thereon too hard. Secondly, it protects the tapered point of the rod 58 from being damaged by striking the window and/or prevents the end of the rod from picking up dirt or dust from the surface of the film or from the surface of the window. Third, it serves to properly and slightly space the tapered end of the rod 58 from the film negative when the head is dropped down on the film, the end of the rod just clearing the film, see Fig. 4. And last, it prevents the film surface from being scratched or otherwise damaged by the end of the rod.

The fact that the rods have the property of integrating the light passing therethrough over the entire area of the exit end thereof makes it possible to use an entrance end which is many times smaller than the exit end. The difference in the amount of light capable of entering the two rods 58 and 59, because of the differences in cross-sectional area of their entrance ends, can be accounted for in balancing the instrument prior to use, namely, by placing the lamp 14 closer to the end of rod 58 than lamp 30 is relative to the end of rod 59.

I have found that for any given cross-sectional area of transparent synthetic plastic rod that a substantial increase in light transmission from a given light source will be obtained if the rod is made from a plastic material which has been rolled to shape rather than extruded to shape. Just why the light transmission of a rolled plastic material is greater than the light transmission of the same plastic extruded to shape is not known, but this fact has been proven by tests to be true. Accordingly, if the maximum brilliance of the matching fields in the present instrument is desired the rods 58 and 59 should be made from a sheet of plastic material rolled to a thickness to obtain one desired dimension and cut off from the sheet in strips having the width of the other desired dimension. This phenomenon might be utilized to eliminate the difference in light transmission caused by having the cross-sectional area of the light entering end of the rod 58 smaller than that of rod 59. For instance, the rod 58 could be made of a rolled plastic material while the rod 59 could be made of an extruded plastic material so that the transmission properties of the rod 58 will be increased over that of the rod 59 to compensate for the difference in the quantity of light entering the two rods due to the difference in the areas of their light entering faces.

The operation of the present densitometer might be outlined to bring out the advantages of the same. First of all, the instrument must be balanced. This is done by turning on the lights, lowering the head 23 directly onto the window 13 with no film in place, and turning the density wedge until the density scale 46 reads zero. The position of lamp 14 is then adjusted toward and from the window 13 by turning screw 22 until the two matching fields formed by the ends of rods 58 and 59 are matched as shown in Fig. 6, and as clearly indicated when the dividing line 66 between the fields, see Fig. 5, substantially disappears. This step corrects for the slight density of the wedge at its zero reading and is referred to as balancing the instrument.

When this is done, the head is raised and the film to be measured is laid flat on the top of the base and is shifted around until the small clear circle C in the center of the window 13 appears in the area of the negative the density of which is to be measured. The use of a small clear circle on an otherwise diffusing window makes this selection very easy and accurate. Then the head is lowered onto the film so that the tapered end 61 of rod 58 is directly over the selected area of the negative. Looking into the tunnel 67 at the comparison field, the density wedge is then rotated until the two semi-circular matching fields are matched as indicated by the disappearance of the dividing line 66 between them, and then the value of the density of the selected area of the negative is read directly off of the scale 46.

Although I have shown and described certain specific embodiments of my invention, I am fully aware that many modifications thereof are possible. My invention, therefore, is not to be restricted to the precise details of construction shown and described, but is intended to cover all modifications coming within the scope of the appended claims.

Having thus described my invention, what I claim is new and desire to secure by Letters Patent of the United States is:

1. A densitometer comprising in combination a support, two matched light sources mounted on said support in spaced relation and shielded from one another; a window disposed in the path of the rays of one of said light sources and over which a photographic negative the density of which is to be measured is adapted to be disposed for illumination; a density wedge movable across the path of the rays of the other light source; a first rod of light transmitting material on said support for transmitting the light passing through said negative to a matching field; the light entering end of said rod being disposed adjacent the surface of said negative, the other end of said rod constituting a matching field and having a plane side extending longitudinally of the rod; a second rod of light transmitting material on said support for transmitting the light passing through said density wedge to a matching field; the exit end of said rod having a plane side extending longitudinally of the rod, and constituting a second matching field, said rods so disposed relative to one another that the plane side of the exit ends thereof are in abutting relation but separated to prevent optical contact and the exit ends of the two rods constitute the matching fields and in combination form a comparison field having a line of demarcation which will substantially disappear when the two fields making up the comparison field are matched in intensity by rotation of said density wedge.

2. A densitometer according to claim 1 in which the light entering end of said first rod is tapered toward the light entering end to a cross section substantially less than that of the main portion of said rod to facilitate the density measurement of small selected areas of the photographic negative.

3. A densitometer according to claim 1 in which said window and density wedge lie in planes at an angle to, and adjacent, one another for purposes of compactness and said two light transmitting rods are made of a transparent plastic material and one is straight while the other is curved to accommodate said disposition of the window and density wedge.

4. A densitometer according to claim 1 in which said support comprises a hollow base portion in the top of which said window is located and within which, and below said window, is disposed one of said light sources; and a head pivoted to the top of said base to move to and from the same; said other light source, said density wedge and said two light transmitting rods being mounted within said head and so positioned therein that when the head is lowered onto the top of said base, the light entering end of said first rod is disposed above and in spaced relation to said window.

5. A densitometer according to claim 1 in which said window is provided with a closure which is light diffusing with the exception of a small transparent area substantially equal to the area of the light entering end of said first rod and in alignment with which said end of the rod is disposed.

6. A densitometer comprising in combination a hollow base; a light diffusing window in the top of said base over which a photographic negative is adapted to be positioned; a light source within said base below said window for illuminating the same; means for adjusting the position of said light source to and from said window to vary the intensity of illumination of said window; a head pivotally mounted on the top of said base to move to and from an operative position; a second light source substantially matched with that in the base mounted in said head; a density wedge movably mounted in said head in intercepting relation with the light rays of said second source; a pair of light transmitting and integrating rods mounted in said head, each rod being adapted to transmit light which enters one end thereof to the other end and integrate it over the area thereof so that the exit end constitutes a matching field; the exit end of each rod having a flat side extending longitudinally of the rod; means for mounting said rods in said head so that the entering end of one is above and slightly spaced from said window when the head is in its operative position and the entering end of the other receives the light rays passing through said density wedge, and so that the exit ends of the rods have their flat sides in abutted relation but free from optical contact, whereby two matching fields are formed in side-by-side relation, which are separated by a visible line of demarcation which will substantially disappear when the matching fields are matched in light intensity.

7. A densitometer according to claim 6 in which the means for adjusting the position of said light source to and from said window includes a walking beam pivoted in said housing; said light source fixed to one end of said beam; and an adjusting screw in threaded engagement with the other end of said beam and accessible for adjustment from the top of said base.

8. A densitometer according to claim 6 in which a scale associated with the movable density wedge co-operates with a fixed index on the head to give the values of density measured on the instrument.

9. A densitometer according to claim 6 in which the entering end of the rod above the window is reduced to approximately 1 sq. mm. in cross-sectional area while the cross-sectional area of the exit end of this rod is many times this value to provide a matching field of sufficient size to be easily judged.

10. A densitometer according to claim 6 in which the rods are made from a transparent plastic material which has characteristics resulting from being rolled to shape in order to obtain the maximum amount of light transmission.

11. A densitometer according to claim 6 including a tube of rigid opaque material fixed to said head and enclosing the entire length of the rod through which light from the negative is transmitted with the exception of the extreme entrance end thereof; a washer of substantially resilient material fixed to the lower end of said tube in encircling relation with the end of said rod to prevent the film from being damaged when the head is dropped down thereon when moved to its operative position, the thickness of said washer being such as to just space the end of the rod from the film and window when the head is moved to its operative position.

12. A densitometer comprising in combination a support; two matched light sources mounted on said support in spaced relation and shielded from one another; a window disposed in the path of the rays of one of said light sources and over which a photographic negative the density of which is to be measured is adapted to be disposed for illumination; a density wedge movable across the path of the rays of the other light source; a first rod of light transmitting material on said support for transmitting the light passing through said negative to a matching field; the light entering end of said rod being disposed adjacent the surface of the negative, the other end of said rod constituting a matching field and having a plane side extending longitudinally of the rod; a second rod of light transmitting material on said support having one end adjacent the density wedge and for transmitting the light passing through said wedge to the other end of the rod which constitutes a matching field and which is provided with a plane side extending longitudinally of the rod, said rods so disposed relative to one another that the plane sides of the exit ends thereof are in parallel side-by-side relation and in combination constitute a divided comparison field adapted to facilitate balancing of the two matching fields; and means for preventing light from passing from one rod to the other at the points where the plane surfaces thereof are in side-by-side relation.

13. A densitometer, according to claim 12, in which said last-mentioned means comprises a thin layer of light-reflecting material separating the plane surfaces of the exit ends of said rods.

CLIFTON M. TUTTLE.